United States Patent
Ozersky et al.

(10) Patent No.: US 11,572,312 B2
(45) Date of Patent: Feb. 7, 2023

(54) METHOD OF MAKING CONCRETE

(71) Applicant: MACROCEMENT INDUSTRIES LTD., Toronto (CA)

(72) Inventors: Alexander Ozersky, Richmond Hill (CA); Alexander Khomyakov, Vaughan (CA)

(73) Assignee: MACROCEMENT INDUSTRIES LTD., Toronto (CA)

( * ) Notice: Subject to any disclaimer, the term of this patent is extended or adjusted under 35 U.S.C. 154(b) by 0 days.

(21) Appl. No.: 17/752,054

(22) Filed: May 24, 2022

(65) Prior Publication Data

US 2022/0281773 A1 Sep. 8, 2022

Related U.S. Application Data

(63) Continuation of application No. PCT/CA2021/051252, filed on Sep. 10, 2021.

(60) Provisional application No. 63/137,216, filed on Jan. 14, 2021, provisional application No. 63/084,677, filed on Sep. 29, 2020.

(51) Int. Cl.
| | |
|---|---|
| *C04B 28/28* | (2006.01) |
| *B28C 5/48* | (2006.01) |
| *C04B 103/32* | (2006.01) |
| *C04B 103/50* | (2006.01) |

(52) U.S. Cl.
CPC .............. *C04B 28/28* (2013.01); *B28C 5/485* (2013.01); *C04B 2103/32* (2013.01); *C04B 2103/50* (2013.01)

(58) Field of Classification Search
CPC . C04B 28/28; C04B 2103/32; C04B 2103/50; B28C 5/485
See application file for complete search history.

(56) References Cited

U.S. PATENT DOCUMENTS

| 6,355,191 B1 | 3/2002 | Toncelli |
| 2007/0163470 A1 | 7/2007 | Chanut et al. |

FOREIGN PATENT DOCUMENTS

| CA | 3054411 A1 | 9/2018 |
| CA | 3115734 A1 | 7/2020 |
| WO | 2020073119 A1 | 4/2020 |

OTHER PUBLICATIONS

"International Search Report for PCT/CA2021/051252, dated Dec. 9, 2021, Canadian Intellectual Property Office".
"Written Opinion of the International Searching Authority for PCT/CA2021/051252, dated Dec. 9, 2021, Canadian Intellectual Property Office".

*Primary Examiner* — Anthony J Green
(74) *Attorney, Agent, or Firm* — Bhole IP Law; Anil Bhole; Marc Lampert

(57) ABSTRACT

The present invention relates to relates to methods of making concrete from cement and, in particular, methods of making usable standard concrete from aged or otherwise substandard cement.

19 Claims, 2 Drawing Sheets

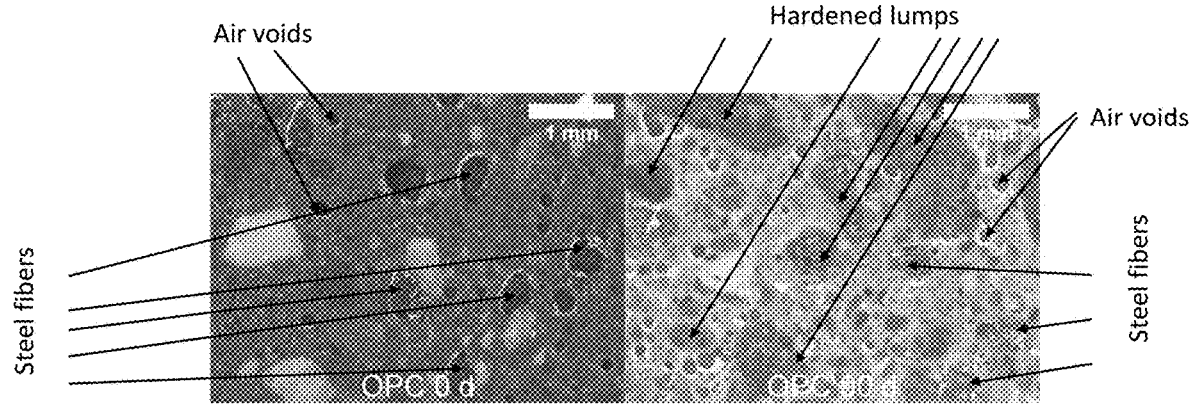
Figure 1A  Figure 1B
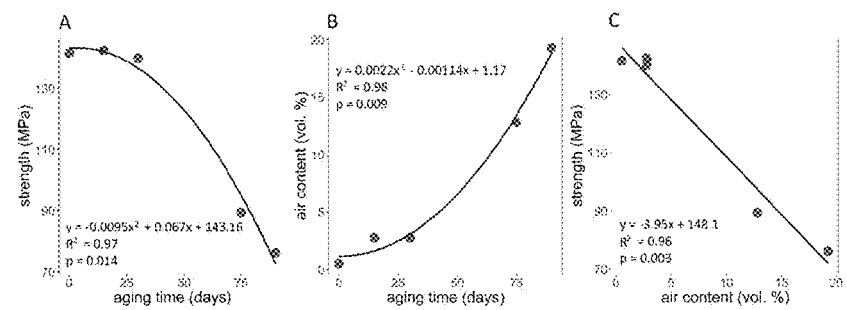
Figure 2A  Figure 2B  Figure 2C

METHOD OF MAKING CONCRETE

FIELD OF THE INVENTION

The present specification relates generally to a method of making concrete, and more particularly to a method of making concrete from substandard cement.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

It is generally known in the industry that exposure of cement to the surrounding atmosphere causes absorption of moisture from air and an irreversible chemical interaction of the cement with water—hydration. As a result, the cement loses its activity over time as the duration of exposure to air increases. Portland cement is designed to react chemically with water and any exposure to the surrounding moisture will cause it to set and harden. The universal recognition of this inevitable deterioration of cement during transportation and storage explains its limited guaranteed shelf life being generally limited to six months, and in some cases cement only remains useful for a period of three months or less from delivery to the end user. The negative impacts of this prehydration on the cement activity and concrete strength has been long recognized.

Accordingly, there have been attempts to address this issue through chemical modification of cement. A historical example is found in U.S. Pat. No. 2,996,394 (Stoll) which discloses a hydrophobic, non-caking cement product adapted for protracted storage in high humidity areas, consisting of Portland cement, 0.1 to 0.4 percent of oleic acid, and 0.04 to 0.20 percent of tri-n-butyl phosphate (a detraining agent).

Another example is found in U.S. Pat. No. 10,590,040 (Ozersky et al.) which discloses a macro-cement and associated methods useful for preparing pastes, mortars, concretes and other cement-based materials having high workability, high density, and high strength. A method of producing a macro-cement is disclosed which includes cement, supplemental cementitious materials (SCM's), including siliceous submicron-sized particles and nano-sized particles, and polymers in the form of liquid or dry chemical admixtures for concrete. The cement mixture may be used for making ultra-high performance concrete (UHPC). The macro-cement can be produced in the form of granules, pellets, briquettes or tablets by mechanical activation during the process of coating and/or loading of the cementitious materials in order to extend the shelf life.

The above patent describes "macro-cement" as referring to both the dry cement produced from the combination of the above ingredients and the mixture of the ingredients themselves. Macro-cement can come in various forms, such as granulated, pelletized, briquetted, tabletted engineered dust-free macro-cement forms with extended shelf life and high workability useful for preparing pastes, mortars, concretes and other cement-based materials with high density and strength, increased early and final strengths, and accelerated reaction rate in cementitious mixtures.

Yet another example is found in International Patent Application Publication No. WO2020/073119A1 (Ozersky et al.) which discloses a process for producing a self-protecting cement by combining a cement precursor and a wax, where the wax comprises alkyl ketene dimer wax and/or alkenyl ketene dimer wax; and grinding the cement precursor and the wax to yield cement grains coated with wax in order to extend the shelf life of the cement.

The above publication describes "self-protecting cement" as referring to a cement which is protected to a significant degree from deterioration from contact with atmospheric moisture and from accidental short-term contact with water prior to preparing cement compositions, or, in other words, is substantially hydrophobic.

However, shelf life remains an issue for cement. Furthermore, there still remains the problem of attempting to use or otherwise recover cement that has been compromised in order to form useful concrete.

Accordingly, there remains a need for improvements in the art.

SUMMARY OF THE INVENTION

In one aspect of the invention, a method of making concrete from substandard cement is provided, the comprising: adding a superplasticizer to the substandard cement at the concrete wet mixing stage, where the superplasticizer comprises at least 125% of the normal recommended amount used with standard cement; adding an air-detrainer in the concrete wet mixing stage, the air detrainer comprising at least 140% of the normal recommended amount used with standard cement; creating a cementitious material from the foregoing steps; and deaerating the cementitious material during the discharge period of the cementitious material from the mixer via a vibrating thin layer reactor, the thin layer reactor forming a thin continuous layer of plastic cementitious material and temporarily reducing the viscosity of the plastic cementitious material in the reactor.

In embodiments, the method further comprises dry processing the substandard cement together with fine aggregates in a high shear mixer prior to the concrete wet mixing stage.

In embodiments, the dry processing further comprises adding supplementary cementitious materials in the high shear mixer.

In embodiments, the dry processing in the high shear mixer provides compression and shear forces capable of disrupting cement agglomerations without comminution of the individual particles.

In embodiments, the dry processing further comprises an addition of water such that a ratio of water to cement is between 0.07 to 0.15.

In embodiments, the superplasticizer comprises from 125% to 400% of the normal recommended amount.

In embodiments, the superplasticizer is selected from one of a normal-, mid-, and high-range water reducing admixture.

In embodiments, the superplasticizer is a polycarboxylate-based high-range water reducer.

In embodiments, the air detrainer comprises from 140% to 500% of the normal recommended amount.

In embodiments, the air detrainer is selected from one of: tributyl phosphate, dibutyl phosphate, dibutylphthalate, polydimethylsiloxane, dodecyl (lauryl) alcohol, octyl alcohol, polypropylene glycols, water-soluble esters of carbonic and boric acids, and lower sulfonate oils.

In embodiments, the layer of the plastic cementitious material has a thickness ranging from 2 diameters to 10 diameters of the largest aggregate size in the plastic cementitious material.

In embodiments, the plastic cementitious material is resident on the thin layer reactor for a duration between 4 seconds and 40 seconds.

In embodiments, the thin layer reactor has a tilt angle of 0 degrees to 20 degrees relative to horizontal.

In embodiments, the thin layer reactor has an amplitude of plate oscillation from 0.5 mm to 15 mm and a vibration frequency from 7 Hz to 50 HZ.

In embodiments, the thin layer vibrates using one of: a circular oscillation and linear oscillation.

In embodiments, the thin layer reactor is comprised of an inclined, vibrating plate.

In embodiments, a vibration frequency of the vibrating plate is between 7 Hz and 0 Hz.

In embodiments, a vibration amplitude of the vibrating plate is between 0.5 mm and 0 mm.

In embodiments, a tilt angle of the vibrating plate relative to horizontal is between 10 degrees to 40 degrees.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which:

FIG. 1A is an optical microscope image of a polished section of concrete made with fresh (0-day aging) cementitious dry blend with ordinary Portland cement;

FIG. 1B is an optical microscope image of a polished section of concrete made with aged (90 days accelerated aging) cementitious dry blend with ordinary Portland cement;

FIG. 2A is a plot of concrete compressive strength after 28 days vs. accelerated aging duration;

FIG. 2B is a plot of air content in concrete vs. accelerated aging duration;

FIG. 2C is a plot of concrete compressive strength after 28 days vs. air content in the concrete.

Like reference numerals indicated like or corresponding elements in the drawings.

DETAILED DESCRIPTION OF THE EMBODIMENTS

Figure 3:
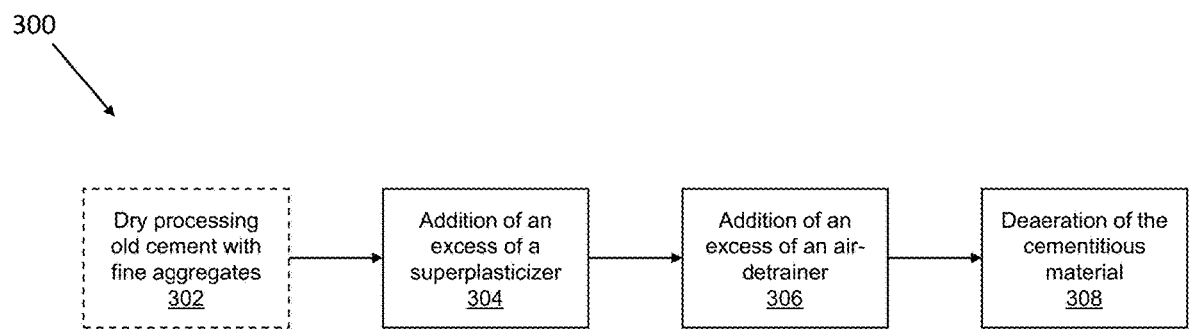
FIG. 3 is a flowchart for a method for making standard concrete from substandard cement.

The present invention relates to methods of making concrete from cement and, in particular, methods of making usable concrete from aged or otherwise substandard cement.

In many practical applications, cement may exhibit characteristics such as deterioration and/or deactivation during storage caused by formation of a crust of hydration products on the surface of cement grains. This serves to reason that restoring the activity of old cement is possible by regrinding it and thus by exposure of the non-hydrated interior of the cement grains [Yelisieieva M. O., Experience and prospects of application of mechanical activations in the technology of concretes production, «Young Scientist»•No 6 (21)•Part 1•June, 2015, 23-26].

It is suggested by WO 2009/120115 A1 (Olkhovsky) to use for the cement regrinding high speed impact mills, disintegrators, which use a process of cement grinding and mechanical activation in vortex flows. A speed of rotation of 100,000 to 300,000 revolutions per minute, by means of impact action, produced by collision of deorbited particles, and the particle breakage by centrifugal forces. However, the regrinding cement approach is not widely used due to its inherent disadvantages.

It is generally acceptable that cement degrades over time by absorbing ambient moisture from the surrounding atmosphere (hydration). This process has been described by Dubina et al. [Dubina et al., Impact of environmental moisture on C3A polymorphs in the absence and presence of $CaSO_4 \cdot 0.5H_2O$, Adv. Cem. Res. 26 (2014), 29-40], who suggest that "during improper storage of actual cements, capillary condensation may occur between the cement particles, initiating partial surface hydration and resulting in products identical to those formed under normal hydration conditions" and that "prehydration of cement leads to dramatic retardation of hydration" [Dubina et al., Interaction of water vapour with anhydrous cement minerals, Adv, Appl. Ceram. 109 (2013), 260-268].

However, if an assumption is made that this explanation only partially describes the phenomenon of reduction of concrete strength with increase cement storage time, then other factors may be considered an address when making concrete from cement.

Another, and potentially more significant factor determining strength reduction in concrete based on the increase in the shelf life of the cement, and previously not taken into account, is the air content in concrete made from aged cement. Experimental data and subsequent statistical analysis suggest the existence of a previously unknown phenomenon in that the air content in the concrete increases with increased storage time of the cement used in making the concrete. Understanding this phenomenon formed the basis for the development of the method for making standard concrete from old substandard cement.

Common cement bulk density is below 1.5 $g/cm^3$ and its specific gravity is above 3 $g/cm^3$ suggesting that air occupies more than a half the volume of the bulk cement, or in other words, the cement grains are significantly spaced apart. It was discovered that the hydration products on the surface of cement grains exhibited long and thick crystals and create "bridges" between neighboring cement grains. Gradually, as the cement ages, the number of the "bridged" grains grows and these bridged grains form agglomerate lumps with air locked between the grains. The number of lumps, their sizes and their strength increase with storage time (aging) of the cement. During concrete mixing these lumps partially break down to smaller pieces, releasing the air trapped within. Most of this air remains in the plastic concrete mix and then in the final hardened concrete in the form of air voids. It may be observed that number and size of air voids and hardened agglomerate lumps in concrete made from aged cementitious composition (FIG. 1B) is larger than in concrete made from fresh cementitious composition (FIG. 1A).

Based on this data, a process to improve the quality of hardened concrete produced from aged cement requires a method to reduce the air content (air voids) in the hardened concrete. The method of reducing air in the concrete is performed in two stages: first, the destruction of the agglomerate lumps in order to release the air trapped inside the lumps, and second, removing this released air from the freshly mixed cement paste (mortar or concrete).

FIG. 3 illustrates a method of making concrete in accordance with the present embodiments. In example where the aged cement exhibits unacceptable amounts of agglomeration, it is preferable to perform a preliminary stage in the method. However, it should be understood that the preliminary stage may not be required where, for example, agglomeration is acceptable or where alternative approached to mitigating agglomeration are used.

The method 300 comprises, in preferred embodiments, at block 302, a preliminary stage of destroying cement agglomerate lumps via dry processing the mixture of old cement together with fine aggregates and, in some cases, supplementary cementitious materials (SCM) in high shear mixers. The SCM may include micron-sized siliceous, sub-micron-sized particles and/or nano-sized particles to coat the cement particles with a monolayer of $SiO_2$-containing micron, submicron particles and/or nanoparticles. The dry processing is performed under the condition that the mixture being processed is exposed to compression and shear forces capable of disrupting cement agglomerations without comminution of the individual particles. The cement agglomerate lumps are broken up by strong compression and shear forces and the crust of hydrated products on the surface of the cement grains is peeled off the cement grains surface under the influence of strong frictional forces between the particles of the mixture.

The mixing energy density should be sufficient for the cement particles to be de-agglomerated, uniformly and fully dispersed and simultaneous homogenizing said cement by high shear with no ingredients segregation and separation. As non-limiting examples, various equipment can be used as a high shear mixer; such as Hybridizer™ from Nara™, Mechanofusion™ and Cyclomix™ systems from Hosokawa Micron™, magnetically assisted impaction coater (MAIC™) from Aveka™, and other devices providing high internal friction in the mixture.

In some cases, internal friction forces in the mixture can be increased by addition a small amount water to the mixture having a water to cement ratio in the range of 0.07 to 0.15. Processing of the old cement together with fine aggregates and, in some cases, supplementary cementitious materials, can be performed immediately prior to wet mixing of concrete, and the processed material can then be fed from the high shear mixer directly into a wet concrete mixer.

Mixing with the fine aggregates allows for subsequently casting a shaped element or structure and hardening of the subject. The fine aggregates utilized herein may be any conventional mineral aggregate, such as sand or a mixture of sand with gravel, crushed stone or equivalent materials. The crushed stone may be limestone, basalt, granite, bauxite, etc.

The method of making concrete 300 comprises destroying agglomerate lumps during concrete mixing in the process of wet grinding of the clumps; in the preferred embodiment, those clumps remaining after the dry processing described herein. The grinding process may be intensified through the use of a surfactant, which enhances the Rebinder wedging effect, increasing the wettability of the solid, and facilitating the penetration of water into smaller cracks of the cement lumps, thereby assisting in a more complete and accelerated destruction of the lumps.

Water-reducing admixtures may be used to reduce the water requirements of a concrete mixture which includes the addition of surfactant. Particularly, high-range water-reducing admixtures (HRWRAs) such as ether-based polycarboxilate (PCE) superplasticizers are generally surface-active substances suitable for use.

Therefore, at block 304 of the method 300 of making standard concrete from substandard cement is addition of an excess of a superplasticizer, such as a PCE superplasticizer, in the concrete wet mixing stage on the order of 125% to 400% (depending on cement age and mixing conditions) of the normal recommended amount of the superplasticizer used in concrete mixtures with fresh standard cement. For example, if the dosage rate of a certain HRWRA typically ranges from 200 mL to 400 mL/100 kg of cementitious with fresh standard cement, the recommended dosage rate of the same HRWRA would range from 250 mL to 1,600 mL/100 kg of cementitious with substandard cement.

However, it is known in the art that polycarboxilates having a fairly high surface energy at the liquid-gas interface, exhibit a noticeable air-entraining effect, i.e. they introduce some foam when mixed into concrete, and the use of a defoamer, or an air-detrainer is commonly recommend when using a PCE.

Accordingly, at block 306 of the method of making standard concrete from substandard cement is addition of an excess of an air-detrainer in the concrete wet mixing stage on the order of 140% to 500% (depending on cement age and mixing conditions) of the normal recommended amount of the air-detrainer used in concrete mixtures with fresh standard cement. For example, if dosage rate of a certain air detrainer ranges from 0.1% to 0.7% in weight of the fresh standard cement, the recommended dosage rate of the same air detrainer would range from 0.14% to 3.5% in weight of the substandard cement.

Suitable air-detrainer admixtures may include, but are not limited to, tributyl phosphate, dibutyl phosphate, dibutylphthalate, polydimethylsiloxane, dodecyl (lauryl) alcohol, octyl alcohol, polypropylene glycols, water-soluble esters of carbonic and boric acids, and lower sulfonate oils.

However, air detraining process control in concrete mixers is generally poor as effective air-detrainers (also known as deaerators and/or defoamers) exhibit insolubility in the medium to be treated, i.e. air-detraining mixtures should be insoluble in water (hydrophobic) to be effective. This insolubility results in either poor mixing of the air-detrainers in low intensity concrete mixers or separation of oily defoamers from aqueous concrete mixtures and forming a top layer in higher intensity concrete mixers.

Additionally, the low efficiency of the known air-detrainers used according to existing technology of deaerating on the stage of wet mixing is the result of the relatively high viscosity of plastic cement paste (mortar, concrete) and rather large distance air bubbles are required to travel to the mixture surface, where they are destabilized and thus burst. Taking into account the low rising velocity of the air bubble, which follows Stokes' Law (proportional to the radius squared of air bubbles), this velocity decreases significantly for micro-scale bubbles and is also inversely proportional to the viscosity of cement paste (mortar, concrete), which is known to be relatively high. Thus, given the effectively large distance air bubbles must travel to the mixture surface, even prolonged mixing time is not sufficiently lengthy for thorough air removal.

Therefore, at block 308 of the method of making standard concrete from substandard cement is deaeration of the cementitious material during the discharge period of the material from mixer in a specially designed thin layer reactor to form a thin continuous layer of plastic cementitious material and temporarily reducing the viscosity of this material in the reactor. By reducing the viscosity of plastic cementitious material, according to Stokes' Law as discussed above, the rising velocity of the air bubbles inside the material proportionally increases; and the creation of the thin continues layer reduces the distance that the air bubbles must travel to the surface of the cementitious material, which overall increases both the speed and thoroughness of the cementitious material deaeration.

The active element of the thin layer reactor is an inclined vibrating plate on which the cementitious material moves out from the mixer. Accounting for the thixotropic nature of the plastic cementitious materials, and that their viscosity decreases with an increase of shear rates, the vibration of the plate significantly reduces the viscosity of the material.

The thickness of the plastic cementitious layer on the vibrating plate, for providing efficient material deaeration without causing segregation (de-mixing) of the material, should be in the range from 2 diameters of the largest aggregate size in the mixture up to 10 diameters of the largest aggregate size in the mixture. The residence time of the material on the vibrating plate should be, depending on the mixture design, in the range between 4 and 40 seconds. The tilt angle of the plate to the horizon is in the range between 0 degrees (i.e. fully horizontal) to 20 degrees; with the amplitude of the plate oscillation in the range from 0.5 to 15 mm; and the vibration frequency from 7 to 50 Hz and the direction of vibration may be linear or circular.

Although deaeration of the cementitious materials is increased on a vibrating over a fixed plate, in cases where the installation of a vibrating plate is not easily accomplished, it may be possible to use a fixed inclined plate on which the cementitious materials moves during its discharge from concrete mixer. In this case, the tilt angle of the fixed plate to the horizon is in the range between 10 degrees to 40 degrees.

EXAMPLES

The following examples are illustrative in nature and are not to be construed as representative of all use cases of the present method, nor of any promise of effectiveness for any use case.

The present example illustrates the compressive strength of concrete samples and air content in these concrete samples made with use of cement after various storage periods of the cement under artificial acceleration conditions to reflect atmospheric again. The concrete mix used is detailed in Table 1.

TABLE 1

| Material | Specific gravity | Type | kg/m³ |
| --- | --- | --- | --- |
| Cement | 3.15 | CRH (Type HE) | 999 |
| Silica fume | 2.20 | Elkem 955U | 230 |
| Ground quartz | 2.65 | US Silica Min-U-Sil-30 | 100 |
| Fine aggregate 1 | 2.65 | Fairmount Santrol LS-80 | 200 |
| Fine aggregate 2 | 3.25 | Bauxite, size 0-1 mm | 500 |
| Polycarboxylate superplasticizer | 1.18 | Kao Mighty 21PSN powder | 16 |
| Metal fibres | 7.85 | Dramix OL 6 mm, ø 0.16 mm | 300 |
| Water | 1.00 | City of Toronto | 250 |

In order to confirm as discussed above, that as the shelf life of cement increases, the amount of air in concrete made from this cement increases, and that this air content increase is a significant factor in determining the strength reduction in the final concrete. According experiments were conducted during which cement samples were subjected to accelerated aging (at a temperature of about 40° C. and relative humidity (RH) close to 100%) for certain periods of time (0, 15, 30, 75, and 90 days), concrete was made from compositions with these cement samples, and compressive strength (after 28 days) of the concrete samples and the air content in the samples were measured with the results shown in Table 2.

TABLE 2

| Cement storage time, (accelerated aging), days | Compressive strength of concrete after 28 days, MPa | Air content in concrete, vol % |
| --- | --- | --- |
| 0 | 141.59 | 0.53 |
| 15 | 142.46 | 2.79 |
| 30 | 139.95 | 2.77 |
| 75 | 89.45 | 12.81 |
| 90 | 76.26 | 19.28 |

A regression analysis was carried out in an R statistical computing environment to process strength data and air content for concrete made with fresh cement, and cements exposed to accelerated aging as shown in FIG. 2. FIG. 2A shows that strength decreased with aging time. FIG. 2B shows that air content increased with aging time. FIG. 2C shows an established negative relationship between strength and air content.

Therefore, with the negative relationship between air content and strength established, the method of producing concrete with reduced air content by a combination of chemical and mechanical process as disclosed herein may be applied to substandard (e.g. aged) cement to produce standard (usable) concrete.

It should also be noted that the steps described in the method can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method of making concrete from substandard cement based on parameters provided for a corresponding standard cement, the parameters comprising a normal recommended amount of superplasticizer and a normal recommended amount of air detrainer, comprising:
   a) adding a superplasticizer to the substandard cement in a high shear mixer at a concrete wet mixing stage, where the superplasticizer comprises at least 125% of the normal recommended amount of superplasticizer with the standard cement;
   b) adding an air detrainer in the concrete wet mixing stage, the air detrainer comprising at least 140% of the normal recommended amount of air detrainer used with the standard cement;
   c) creating a cementitious material from steps a) and b); and
   d) deaerating the cementitious material during a discharge period of the cementitious material from the mixer via a vibrating thin layer reactor, the vibrating thin layer reactor forming a thin continuous layer of plastic cementitious material and temporarily reducing the viscosity of the plastic cementitious material in the vibrating thin layer reactor.

2. The method of claim 1, further comprising dry processing the substandard cement together with fine aggregates in the mixer prior to the concrete wet mixing stage.

3. The method of claim 2, wherein the dry processing further comprises adding supplementary cementitious materials in the mixer.

4. The method of claim 2, wherein the dry processing in the mixer provides compression and shear forces capable of disrupting cement agglomerations without comminution of the individual particles.

5. The method of claim 2, wherein the dry processing further comprises an addition of water such that a ratio of water to cement is between 0.07 to 0.15.

6. The method of claim 1, wherein the superplasticizer comprises from 125% to 400% of the normal recommended amount of superplasticizer.

7. The method of claim 1, wherein the superplasticizer is selected from one of a normal-, mid-, and high-range water reducing admixture.

8. The method of claim 7, wherein the superplasticizer is a polycarboxylate-based high-range water reducer.

9. The method of claim 1, wherein the air detrainer comprises from 140% to 500% of the normal recommended amount of air detrainer.

10. The method of claim 1, wherein the air detrainer is selected from one of:
    tributyl phosphate, dibutyl phosphate, dibutylphthalate, polydimethylsiloxane, dodecyl (lauryl) alcohol, octyl alcohol, polypropylene glycols, water-soluble esters of carbonic and boric acids, and lower sulfonate oils.

11. The method of claim 1, wherein the layer of the plastic cementitious material has a thickness ranging from 2 diameters to 10 diameters of the largest aggregate size in the plastic cementitious material.

12. The method of claim 1, wherein the plastic cementitious material is resident on the vibrating thin layer reactor for a duration between 4 seconds and 40 seconds.

13. The method of claim 1, wherein the vibrating thin layer reactor has a tilt angle of 0 degrees to 20 degrees relative to horizontal.

14. The method of claim 1, wherein the vibrating thin layer reactor has an amplitude of plate oscillation from 0.5 mm to 15 mm and a vibration frequency from 7 Hz to 50 HZ.

15. The method of claim 1, wherein the vibrating thin layer reactor vibrates using one of: a circular oscillation and linear oscillation.

16. The method of claim 1, wherein the vibrating thin layer reactor is comprised of an inclined, vibrating plate.

17. The method of claim 16, wherein a vibration frequency of the vibrating plate is between 7 Hz and 0 Hz.

18. The method of claim 16, wherein a vibration amplitude of the vibrating plate is between 0.5 mm and 0 mm.

19. The method of claim 16, wherein a tilt angle of the vibrating plate relative to horizontal is between 10 degrees to 40 degrees.

* * * * *